(12) United States Patent
Keller et al.

(10) Patent No.: US 6,276,140 B1
(45) Date of Patent: Aug. 21, 2001

(54) DEVICE TO GENERATE ENERGY THROUGH A TURBO ENGINE

(75) Inventors: Jakob J. Keller, deceased, late of Wohlen, By Georg B. Keller, Vera E. Keller, Maria A. Keller-Schärli, legal representatives; Hans Wettstein, Fislisbach, both of (CH)

(73) Assignee: ABB Alstom Power (Schweiz) AG, Baden (CH)

( * ) Notice: Subject to any disclaimer, the term of this patent is extended or adjusted under 35 U.S.C. 154(b) by 0 days.

(21) Appl. No.: 09/486,345

(22) PCT Filed: Jul. 13, 1998

(86) PCT No.: PCT/CH98/00304

§ 371 Date: Jul. 7, 2000

§ 102(e) Date: Jul. 7, 2000

(87) PCT Pub. No.: WO99/10639

PCT Pub. Date: Mar. 4, 1999

(30) Foreign Application Priority Data

Aug. 25, 1997 (DE) .............................................. 197 36 901

(51) Int. Cl.⁷ ................................................. F01K 27/00
(52) U.S. Cl. ............................ 60/641.1; 60/643; 417/150
(58) Field of Search ................................. 60/641.1, 643, 60/650; 417/150

(56) References Cited

U.S. PATENT DOCUMENTS

| 4,278,405 | * | 7/1981 | Angle ..................................... 417/150 |
| 4,767,938 | * | 8/1988 | Bervig .............................. 417/150 X |
| 5,099,648 | | 3/1992 | Angle . |
| 5,537,813 | | 7/1996 | Davis et al. . |

FOREIGN PATENT DOCUMENTS

| 4114678A1 | 11/1992 | (DE) . |
| 29703834 U1 | 10/1997 | (DE) . |
| 0444913A1 | 9/1991 | (EP) . |
| 363805 | 8/1906 | (FR) . |
| 1081853 | 12/1954 | (FR) . |
| 391619 | 5/1933 | (GB) . |
| 2001395A | 1/1979 | (GB) . |
| 2300673A | 11/1996 | (GB) . |

* cited by examiner

Primary Examiner—Hoang Nguyen
(74) Attorney, Agent, or Firm—Burns, Doane, Swecker & Mathis, L.L.P.

(57) ABSTRACT

An apparatus for the generation of energy by means of a fluid-flow machine is described, for the drive of which a compressor arrangement for compressing a compressible medium, preferably air, is provided, which medium, via a feed-line system, can be fed to the fluid-flow machine directly or after the interposition of a combustion chamber, in which the compressed medium can be ignited with the addition of fuel. The invention is distinguished by the fact that the compressor arrangement provides at least one compressor stage, in which the medium can be compressed isothermally.

10 Claims, 4 Drawing Sheets

DEVICE TO GENERATE ENERGY THROUGH A TURBO ENGINE

FIELD OF THE INVENTION

The present invention relates to an apparatus for the generation of electrical energy.

BACKGROUND OF THE INVENTION

Fluid-flow machines, of which, in the heat-engine category, the gas turbine constitutes a widespread energy-converting unit, are used for the generation of energy. Gas turbines are operated with liquid and/or gaseous fuels. A typical recuperator gas-turbine construction has an air compressor, also called turbocompressor, which draws in fresh air, which is typically compressed to a pressure of 4 to 8 bar and, in certain circuits, is forced into a heat exchanger, in which it is preferably preheated by still hot combustion gases flowing from the turbine. In plants without a recuperator, the pressure at the end of the compressor is typically 12–30 bar. Finally, the preheated and compressed supply air passes together with fuels into a combustion chamber, in the course of which hot or combustion gases higher than 1200° C. are produced. These combustion gases flow at high velocity into the turbine and drive the latter, which is normally coupled to a generator for the generation of electricity.

A multiplicity of efforts are made to improve the operation of gas turbines with regard to their power density and their efficiency. The efficiency of a gas turbine depends in principle on the ratio of the energy input into gas turbine to the energy converted by the gas turbine, which energy can be converted into electrical energy by means of a generator. It is thus necessary to reduce the proportion of energy which is theoretically made available to the gas turbine by the combustion gases but is not converted into electrical energy.

A large proportion of the losses of a gas turbine is connected with the relatively high temperatures at the turbine outlet. So that as high a percentage as possible of the heat supplied in the combustion chamber can be converted into mechanical power by the turbine, the pressure ratio of the gas turbine must be selected to be as high as possible.

However, high pressure ratios have the disadvantage that the compressed air is very hot. The result of this is that, at a fixed turbine outlet temperature, with increasing pressure ratio, an ever decreasing amount of heat per kilogram of air can be directed into the combustion chamber. In addition, it is no longer possible to preheat the air, since the air temperature downstream of the compressor, at a high pressure ratio, becomes higher than the exhaust-gas temperature downstream of the turbine.

A further important source of losses in gas turbines is connected with the fact that about ⅔ of the mechanical power of the turbine has to be applied for driving the compressor. Since the turbine and compressor have component efficiencies which are less than 1, the power output of the turbine to the compressor leads to a product efficiency which corresponds to the product of the component efficiencies and is therefore markedly lower than the component efficiencies.

The abovementioned reasons lead to a compromise. The maximum power density of a gas turbine is achieved at a lower pressure ratio than the maximum efficiency. As a rule, the pressure ratio of the gas turbine is therefore selected such that an optimum compromise between power and efficiency is achieved. In addition to the improvement of the abovementioned aspects with regard to the power density and the efficiency of gas turbines, the thermal loading capacity of the individual components which are necessary for the operation of gas turbines is also increasingly important for the conception and design of such plants. Not least for reasons of competition, it is necessary to design gas-turbine plants in such a way that they are not too complicated and consequently not too costly, but on the other hand it is necessary to offer durable and high-quality products.

Thus, for example, conventional compressor stages in each case consist of a rotor and a stator, which are fitted with moving and guide blades and by means of which the air flowing through the compressor stage is heated by the compression from ambient temperature up to above 500° C. Such high temperatures put a considerable strain on the materials used in the compressor stage, and this has a lasting harmful effect on the service life of the individual components involved, so that complicated and extensive cooling measures have to be taken in order to increase the resistance of the materials in the compressor region to the high temperatures which occur. In addition, since the cooling air is very hot, the cooling is difficult and uses a great deal of cooling air.

SUMMARY OF THE INVENTION

The object of the invention is to design an apparatus for the generation of energy by means of a fluid-flow machine in such a way that the power density and the efficiency as well as the service life of the components of the fluid-flow machine, in particular its thermally loaded components, are to be increased.

According to the invention, an apparatus for the generation of energy by means of a fluid-flow machine, preferably a gas turbine, for the drive of which a compressor arrangement for compressing a compressible medium, preferably air, is provided, which medium, via a feed-line system, can be fed to the fluid-flow machine directly or after the interposition of a combustion chamber, in which the compressed medium can be ignited with the addition of fuel, is designed in such a way that the compressor arrangement provides at least one compressor stage in which the medium can be compressed isothermally.

The idea underlying the invention is to convert air into a precompressed state in the course of an isothermal compression in which the air can be compressed to a comparably high degree, as is also possible in the case of conventional air-compressor stages, but without reaching high compression temperatures, so that this air, in the extreme case while avoiding a conventional air compressor section and thus dispensing with the need to drive the air compressor by the gas turbine, is directly available for the drive of the gas turbine. The decisive advantage of isothermal compression lies in the fact that the maximum possible heat supply does not decrease with increasing pressure ratio. Thus the power density remains high even at a high pressure ratio. In addition, recuperation is always possible. Furthermore, the decisive advantage of an open cycle operated with an external isothermal compressor consists in the fact that no efficiency products occur.

Furthermore, it is possible according to the invention to direct isothermally precompressed air to a conventional high-pressure precompressor stage, by means of which the air density is increased to a fixed desired value. In this way, the temperature of the highly compressed air, after passing the high-compression compressor unit, is reduced from normally 555° C. to below 300° C. The low temperature level of the highly compressed air inside the compressor unit helps in particular to ensure that any components present in the compressor unit, such as, for example, moving blades on the rotor and guide blades on the stator, are subjected to lower thermal loads, so that cooling measures can be completely or at least partly dispensed with, as a result of which the arrangement becomes simpler to maintain and becomes more cost-effective. In addition, the cooling-air consumption of the rotor and the turbine, on account of the low air temperature, can be greatly reduced, a factor which considerably increases the power density and efficiency of the plant.

Finally, a gas turbine having the upstream isothermal compression according to the invention offers improved properties with regard to the utilization of the waste heat of the exhaust gases discharging from the gas turbine, especially since, as described above, the temperature level of the highly compressed air, after discharge from a high-pressure precompressor stage arranged downstream of the isothermal compression, is lower than in compressors of conventional gas-turbine plants, and therefore an improved heat transfer takes place between a heat exchanger in which the exhaust gases of the gas turbine are fed back (recuperator) and the highly compressed air.

Although a kinematic drive by means of the turbine is in turn required in order to arrange a high-compression compressor stage downstream of the isothermal compression, as a result of, which the abovedescribed power loss of the gas turbine occurs, this proportion of energy is now considerably reduced compared with the exclusive precompression by means of conventional compressor stages. In addition, the lower temperatures of the highly compressed supply air, after discharge from the high-compression compressor stage, contribute to an improved heat transfer at the recuperator, a factor which has a positive effect on the reduction of exhaust-gas emission values.

The isothermal precompression of air according to the invention before entering a gas turbine or a high-pressure compressor stage arranged upstream of the gas turbine is effected in an especially advantageous manner by utilizing the gravitation along a head along which an air/water mixture falls through a suitably designed flow duct, in the course of which the air experiences isothermal compression by way of hydraulic compression.

The use of the combination according to the invention of isothermal precompression and an energy-producing fluid-flow machine, preferably a gas turbine, is especially suitable at orographically elevated water resources, such as for example mountain lakes, from which water can be taken for hydraulic compression.

Provided for this purpose is a preferably vertically running flow duct, which has a top inlet region and a bottom outlet region, the diameter of the flow duct in the region of the inlet being greater than the diameter in the region of the outlet. Arranged in the inlet region of the flow duct is a nozzle arrangement, which atomizes the water and is intended to produce as large a number of very small water droplets as possible in a large quantity. Likewise, during the water atomization in the inlet region of the flow duct, care is to be taken to ensure that the atomized water is to be mixed with as large an air volume as possible. The air/water mixture produced in this way, on account of its own weight, falls due to the gravitational field through the flow duct, the inner contour of which is designed in such a way that the region close to the inlet region has a largely uniform cross-sectional area along the vertical extent of the flow duct, so that the velocities of the air flow and the falling droplet cloud adapt to one another as quickly as possible by impulse transmission. As soon as the air/water mixture has reached a certain falling velocity of about 6 to 12 m/s, the cross section of the flow duct decreases in the direction of fall, so that the relative difference in velocity between droplet cloud and air or between water and bubbles becomes as small as possible.

Without braking, the droplet cloud would accelerate downward with the gravitational acceleration. The velocity v would increase rapidly according to the formula $$V=\sqrt{2g(X+X_0)} \quad (1)$$

where g denotes the gravitational acceleration and x is the coordinate directed downward. $X_0$ is a constant which approximately corresponds to the starting point of the free falling movement. If the air were also to follow the free fall, the cross-sectional area of the compression shaft ought to follow the law of the conservation of volume $$\Rightarrow A = \sqrt{\frac{X_0}{X+X_0}} \cdot A_0 \quad (2)$$

where $A_0$ denotes the cross-sectional area at the start of the fall shaft and A denotes the cross-sectional area at any location.

According to the invention, the cross section of the fall shaft is now narrowed at a somewhat slower rate than according to (2). The profile of the narrowing is precisely selected in such a way that the braking effect of the air on the droplet cloud leads to a constant, relative difference in velocity, which is as small as possible, between droplet cloud and air.

The efficiency losses of the energy transfer from the droplet cloud to the air correspond directly to the relative difference in velocity. The braking may therefore only be so great that the relative difference in velocity, i.e. v droplet less v air divided by v droplet, remains sufficiently small. The droplet braking than leads to isothermal compression of the air.

Due to the reduction in the cross section of flow, the air trapped between the water droplets, according to Bernoulli's law, experiences a pressure increase which corresponds to isothermal compression. Finally, the isothermally compressed air/water mixture passes through the outlet opening of the flow duct into a collecting basin or high-pressure chamber, which is provided directly at the outlet opening and in which the water separates from the compressed air. The separating action is comparable with the occurrence of large air bubbles which develop in the region of a waterfall plunging into water.

In addition, the flow dynamics of the air/water mixture which falls through the flow duct may be compared to the dynamics of dust or dry snow avalanches. In particular during dust or snow avalanches which consist of dry snow and thus trap a large quantity of air, advance velocities of over 400 km/h, depending on the position on a slope, may occur. Applied to the flow duct in question and to the isothermal compression achievable with it, this means that, for especially efficient compression, an air/water mixture enriched with air to the greatest possible extent is to be produced by means of the water-atomizing device, so that as large a number as possible of very small water droplets are formed or just such a large number of very small bubbles in water.

The air isothermally precompressed in the high-pressure chamber is directly connected to the fluid-flow machine via a corresponding outlet duct if the compression ratio of the air is sufficiently high. Otherwise, the outlet duct is connected to a high-pressure precompressor stage, by means of which the air can be precompressed to a desired value.

The case described above utilizes in particular the natural head of an orographic system, for example of mountain lakes, as a result of which resources are conserved without reducing the power of a fluid-flow machine.

In order to also utilize the advantages of the isothermal compression even at locations where there are no natural heads predetermined by the orography, the air/water mixture can also be directed at high flow velocities into the above-described flow duct by means of rotary machines or by means of high-pressure-jet arrangements, so that in principle the isothermal compression can be achieved with the flow duct irrespective of the orographic conditions. However, such solutions require an additional energy input, which, however, has to be taken into account in the overall efficiency during the operation of a gas turbine.

It has been found that the net output power of gas turbines can be increased by more than a factor of 2 by utilizing the abovedescribed isothermal compression.

BRIEF DESCRIPTION OF THE DRAWINGS

The invention, without restricting the general inventive idea, is described below by way of example with reference to exemplary embodiments and the drawings, in which.

DETAILED DESCRIPTION OF THE INVENTION

Figure 1:
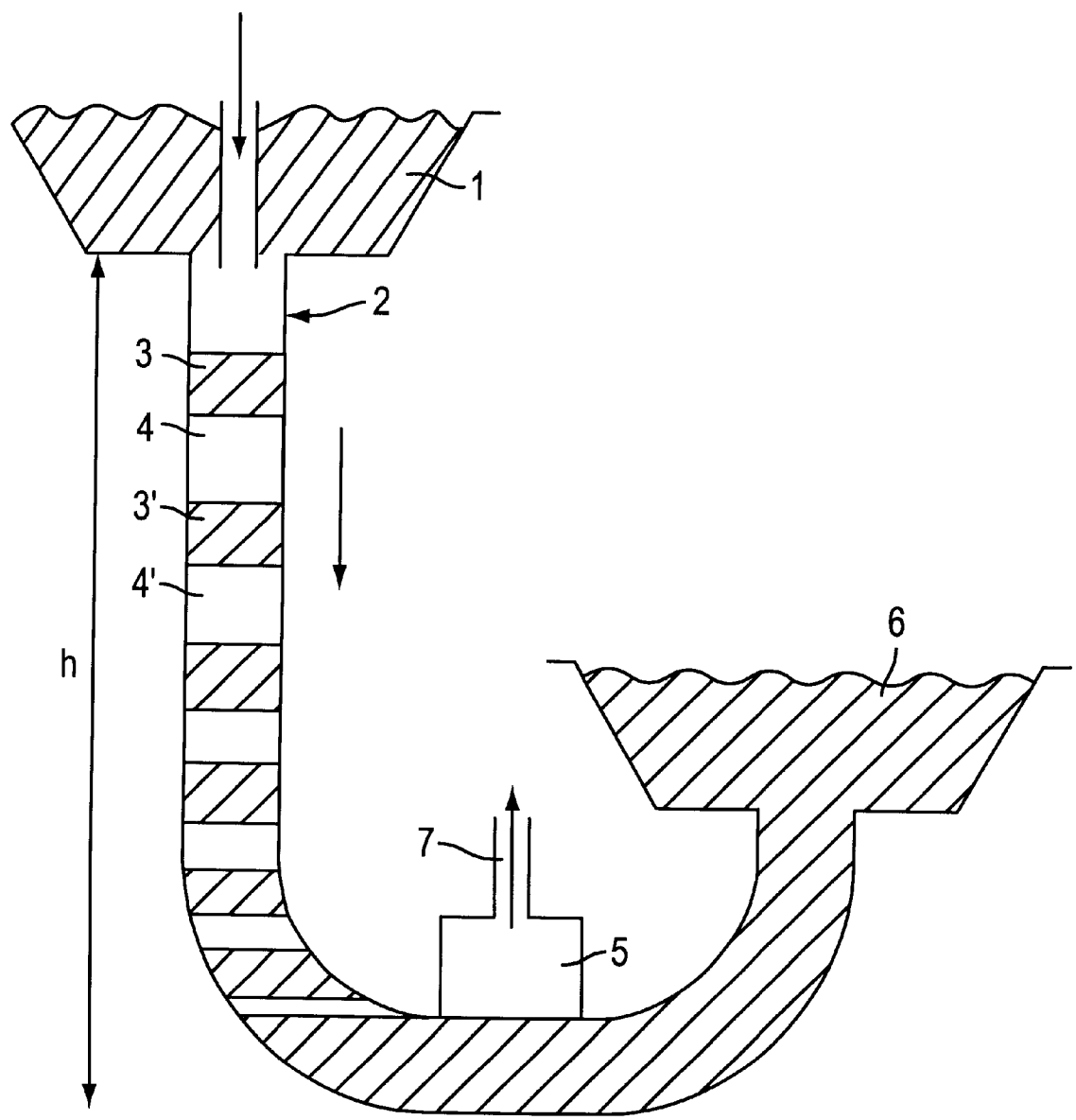
FIG. 1 shows a diagrammatic representation of a bubble compressor for explaining the isothermal compression.

The principle based on the isothermal compression can be seen from FIG. 1. A top water reservoir 1 is connected to a flow duct 2, in which, in the example shown, air pockets 4, 4' are provided between in each case two successive water pockets 3, 3', and these air pockets 4, 4', in the gravitational field, are subjected to the acceleration g due to gravity and move downward in the flow duct 2, which is arranged vertically. The weight of the water leads to isothermal compression of the trapped air pockets. The latter then pass in a compressed form into a high-pressure chamber 5, which is provided in the bottom region of the flow duct 2. In the example shown, the water accelerated by the acceleration g due to gravity passes into a collecting basin 6, in which the water comes to rest. Theoretical and practical tests show that the action of the isothermal compression can be increased if a certain air volume comes into contact with as large a water surface as possible. This presupposes that the water to be directed into the flow duct can be atomized into the smallest possible droplets in order to produce a finely distributed air/water mixture in this way. The air/water mixture which has passed through the flow duct 2 leads to a considerable pressure increase in the high-pressure chamber 5, which provides an outlet duct 7, through which the isothermally precompressed air is specifically drawn off and, for example, can be made available directly to the combustion chamber, which is arranged upstream of a gas turbine.

Figure 2:
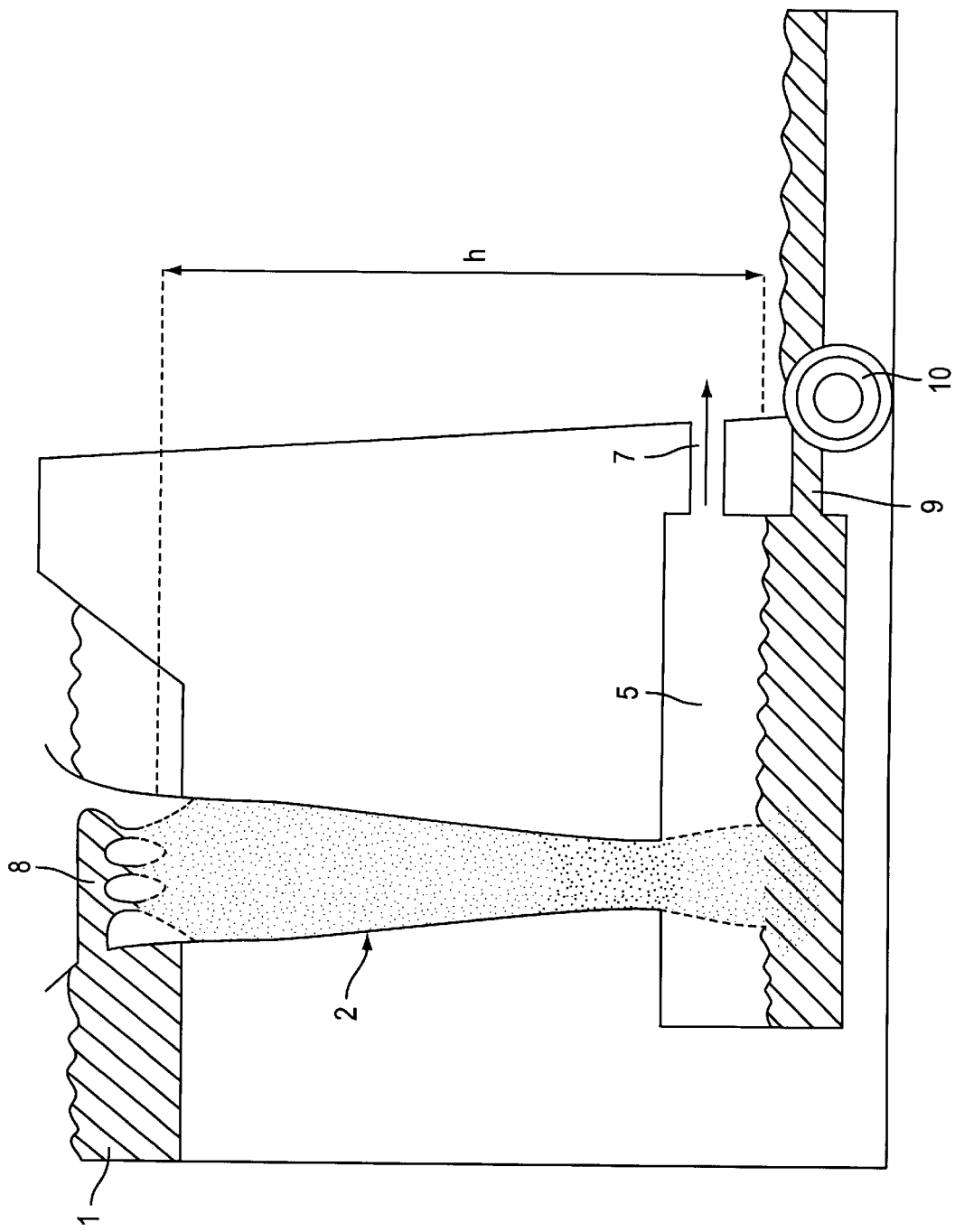
FIG. 2 shows an arrangement for the thermodynamic compression with flow duct.

Shown in FIG. 2 is an advantageous embodiment for the isothermal compression of an air/water mixture which utilizes the potential energy of an elevated water reservoir 1. The cross-sectional representation shown in FIG. 2 shows a water-atomizing device 8, which atomizes the water of the top water reservoir 1 into very fine water droplets while air is admixed. The air/water mixture produced in the inlet region of the flow duct 2 is subjected to the gravitational field and first of all falls vertically downward in free fall in the flow duct 2. The flow duct 2 narrows with increasing depth of fall in such a way that the relative difference in velocity between droplet cloud and air remains sufficiently small and approximately constant. The outlet opening of the flow duct 2 is connected to a high-pressure chamber 5, in which the water is separated from the compressed air. The compressed air is drawn out of the high-pressure chamber 5 via an outlet duct 7 and may be fed to a high-pressure compressor stage of a gas turbine. The water collecting in the high-pressure chamber 5 is discharged from the high-pressure chamber 5 via a bottom outlet duct 9, in the course of which a water turbine 10, preferably a Pelton turbine, which is provided in the outlet duct 9, is driven.

Depending on the power density of the gas turbine which can be supplied with the isothermally precompressed air, the heads and the inner contour of the flow duct 2 are to be suitably dimensioned. In the case of the powerful gas turbines known at present, typical depths of fall of the flow duct of between 30 and 100 m are to be provided. In plants without a downstream adiabatic compressor, larger fall heights are provided. For the air/water mixture formation, about 0.1 to 0.5 $m^3$ of water per kg of air is to be atomized into very small water droplets for an efficient operation. The more the water is atomized, the lower the head can be within the flow duct. Typical values for the diameter of the top inlet region of the flow duct are about 2 to 7 m, depending on the gas turbine. On the other hand, the bottom diameter in the outlet region of the flow duct is typically 0.7 to 2 m.

Figure 3:
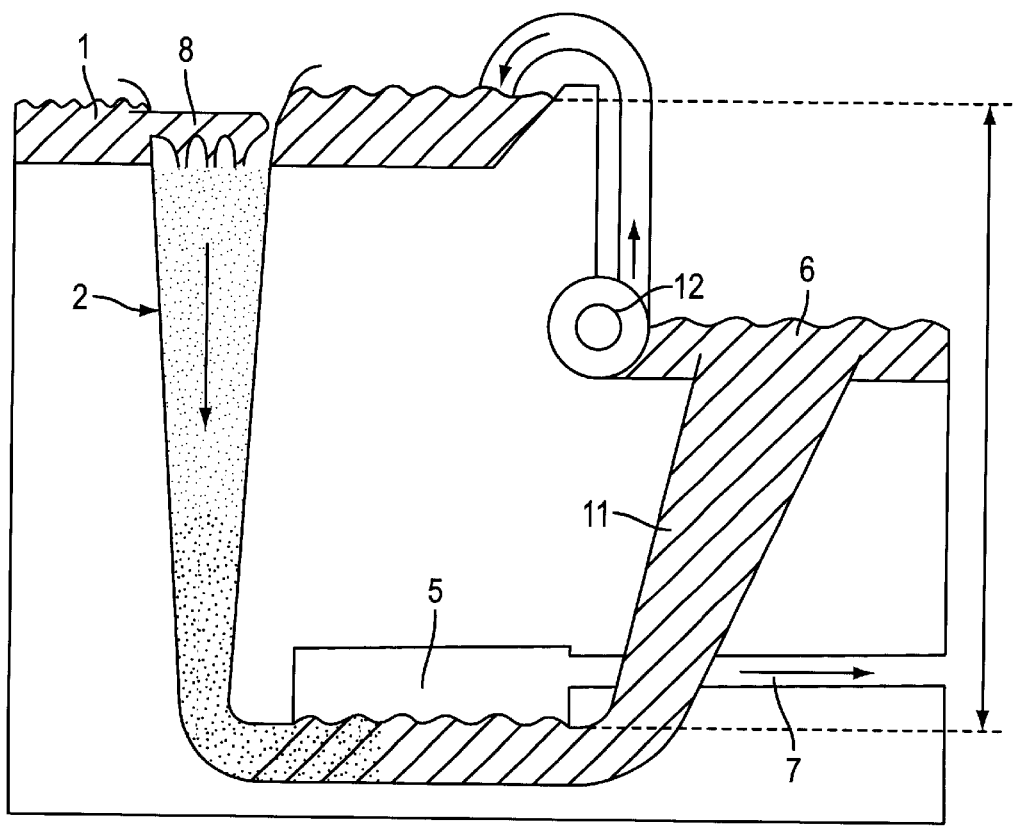
FIG. 3 shows an arrangement like FIG. 2 and an additional partial feedback of the water, and FIGS. 4a, b, c show arrangement variants for a fluid-flow machine which can be operated with isothermal compression.

A further typical embodiment for the isothermal compression is shown in FIG. 3. The air/water mixture, which falls through the funnel-shaped flow duct 2 and can be produced by the water-atomizing device 8, passes in an isothermally compressed form into the high-pressure chamber 5, in which the air separates from the water. The compressed air is drawn off to the outside via a corresponding outlet duct 7. The water quantities flowing through the high-pressure chamber 5 are directed in an adjoining duct 11, which rises upward, into a top collecting basin 6. In this way, the kinetic energy of the water is at least partly converted back into potential energy. Provided in the top collecting basin 6 is a feedback pump 12, by means of which the water located in the collecting basin 6 can be fed back into the top water reservoir 1. By means of this arrangement, it is possible to carry out the thermal compression even in orographically unfavorable locations by virtue of the fact that the flow duct 2 merely has to be put into the ground.

The air compressed isothermally in the manner described above may be made available to a fluid-flow machine in different ways.

Figure 4:
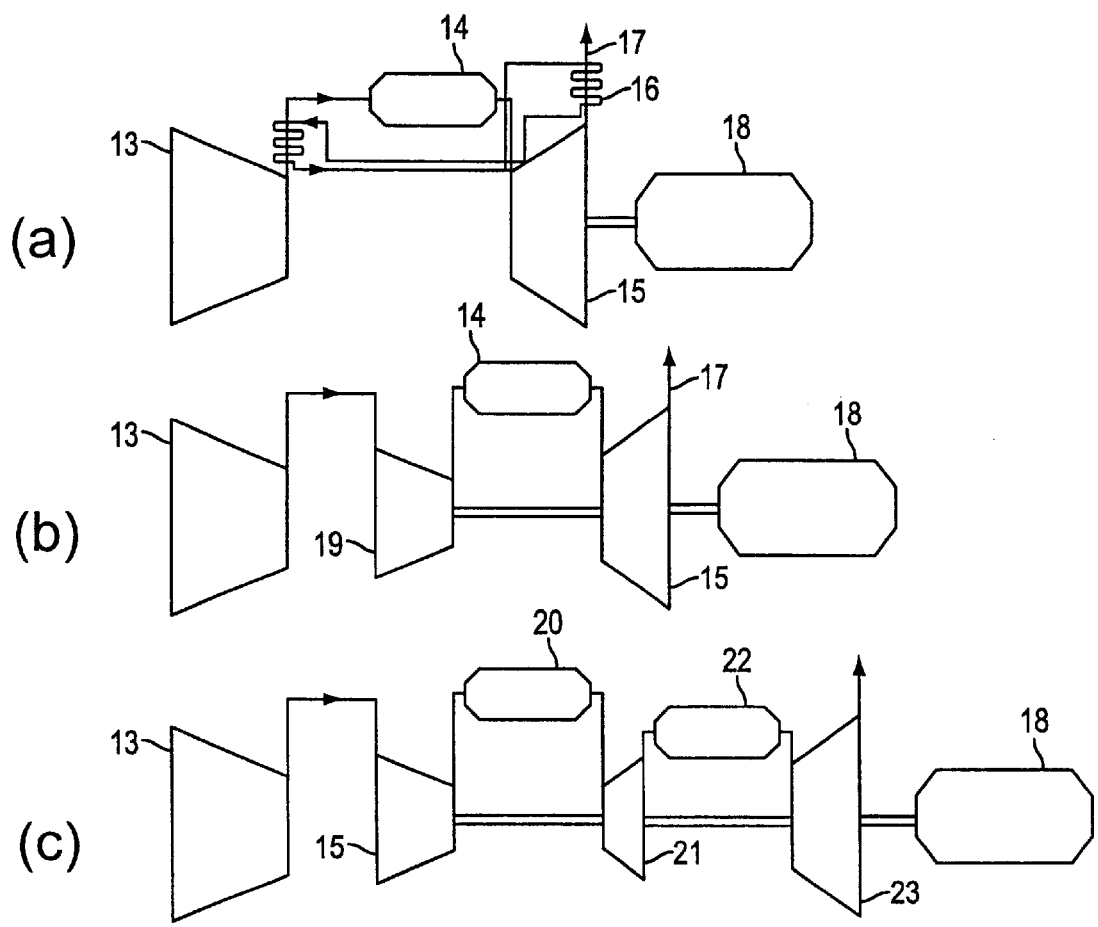

Different embodiments for the operation of a fluid-flow machine for the generation of energy are shown in FIG. 4.

In FIG. 4a, the isothermally precompressed air is fed from the isothermal compressor 13 directly to the combustion chamber 14 of a gas turbine 15. To increase the efficiency, a recuperator 16 is provided, which makes the waste heat of the exhaust gases 17 of the gas turbine 15 available to the isothermally precompressed air. A generator 18, which is connected to the gas turbine 15 via a shaft, is provided for the generation of electrical energy.

In FIG. 4b, the isothermal compressor 13 is connected to a high-pressure compressor stage 19, which further compresses the isothermally precompressed air to a higher compression ratio. The combustion chamber 14, the turbine 15 and the generator 19 known per se are arranged downstream of the high-pressure precompressor 19. As a further variant, FIG. 4c shows an isothermal compressor 13 which is connected to a high-pressure precompressor 19, the highly compressed supply air of which is fed to a high-pressure combustion chamber 20, which drives a high-pressure turbine 21. In a second stage, a low-pressure combustion chamber 22, the hot gases of which are directed into a low-pressure turbine 23, is arranged downstream of the high-pressure turbine 21. The complete arrangement, via a shaft, drives a generator for producing electrical energy.

In the case of the embodiments 4b and 4c, although the gas turbine kinematically drives a precompressor stage, as a result of which a certain portion of the nominal output of the gas turbine is lost, a considerable proportion of the energy to be applied for the compression can be generated by the isothermal precompression according to the invention.

It is conceivable to direct the water and the air through the flow duct in various ways. At orographically suitable locations at which the potential energy of a water reservoir situated at a higher level can be utilized, the water and the air will fall merely by gravitation. In other applications, it is also conceivable to accelerate the air by means of a drivable rotary unit and thus direct it into the flow duct. The other way around, it is also possible to provide a high-pressure liquid jet from water in the inlet region of the flow duct by suitable means, and this high-pressure liquid jet mixes with the air and the water/air mixture is thus obtained.

It is conceivable to direct the water and the air through the flow duct in various ways. At orographically suitable locations at which the potential energy of a water reservoir situated at a higher level can be utilized, the water and the air will fall merely by gravitation. In other applications, it is also conceivable to accelerate the air by means of a drivable rotary unit and thus direct it into the flow duct.

| List of designations | |
| --- | --- |
| 1 | Top water reservoir |
| 2 | Flow duct |
| 3, 3' | Water pocket |
| 4, 4' | Air pocket |
| 5 | High-pressure chamber |
| 6 | Collecting basin |
| 7 | Outlet duct |
| 8 | Water-atomizing device |
| 9 | Bottom outlet duct |
| 10 | Waterpower turbine |
| 11 | Duct |
| 12 | Feedback pump |
| 13 | Isothermal compressor |
| 14 | Combustion chamber |
| 15 | Gas turbine |
| 16 | Recuperator/heat exchanger |
| 17 | Exhaust gases of the gas turbine |
| 18 | Generator |
| 19 | High-pressure precompressor |
| 20 | High-pressure combustion chamber |
| 21 | High-pressure turbine |
| 22 | Low-pressure combustion chamber |
| 23 | Low-pressure turbine |

What is claimed is:

1. An apparatus for the generation of electrical energy by means of a fluid-flow machine by means of an attached generator, a compressor arrangement for compressing a compressible medium, being provided for the drive of the fluid-flow machine, the compressor arrangement, via a feedline system, being connected to the fluid-flow machine directly or with the interposition of a combustion chamber, the compressor arrangement having at least one compressor stage, and the compressor stage having a flow duct with an inlet and an outlet region, there being a water reservoir above the flow duct, the flow duct being connected on the side of the outlet region to a high-pressure chamber, which provides at least two outlet ducts, a top duct for the compressed medium and a bottom duct for water, there being a water-atomizing device having at least one injection nozzle in the inlet region of the flow duct, and the medium with which the medium is compressed being water, characterized in that the flow duct has a variable cross section, the diameter being reduced toward the outlet opening, and thus the inlet region of the flow duct being larger than the outlet region of the vertical flow duct and the mixture of water/compressible medium falling by means of gravitation, so that the relative velocity between atomized water droplets and the medium to be compressed remains approximately constant.

2. The apparatus as claimed in claim 1, characterized in that the flow duct has a first region with an approximately constant diameter and a second region in which the diameter is reduced toward the outlet opening.

3. The apparatus as claimed in claim 1, characterized in that a waterpower machine for the generation of electrical energy is provided in the bottom outlet duct of the high-pressure chamber.

4. The apparatus as claimed in claim 1, characterized in that the bottom outlet duct of the high-pressure chamber is connected via a duct to a collecting basin, which is situated at a higher level than the outlet region of the horizontal flow duct and lower than the inlet region of the horizontal flow duct.

5. The apparatus as claims in claim 4 characterized in that there is a feedback pump in the collecting basin, and this feedback pump is connected to the top water reservoir of the compressor arrangement.

6. The apparatus as claimed in claim 1, characterized in that there is a drivable rotary unit at the inlet region of the flow duct, by means of which rotary unit the medium can be accelerated and directed into the flow duct.

7. The apparatus as claimed in claim 1, characterized in that the fluid-flow machine is a gas turbine.

8. The apparatus as claimed in claim 7 characterized in that the compressed medium, before entering the combustion chamber, is thermally coupled to a heat exchanger, which is thermally fed by the waste heat of the exhaust gases of the gas turbine.

9. The apparatus as claimed in claim 1, characterized in that the at least one compressor stage is connected to a high-compression compressor, and the high-compression compressor is connected to the combustion chamber.

10. The use of the apparatus as claimed in claim 1, characterized in that the flow duct runs at orographic locations where the potential energy of an elevated water reservoir is utilized.

* * * * *